US012641521B2

(12) United States Patent
Lo et al.

(10) Patent No.: US 12,641,521 B2
(45) Date of Patent: May 26, 2026

(54) VOICE CALL CONTINUITY IN VOICE-OVER-Wi-Fi AND EVOLVED PACKET SYSTEM FALLBACK

(71) Applicant: GOOGLE LLC, Mountain View, CA (US)

(72) Inventors: Tai-Lun Lo, Taipei (TW); Ching-Wei Chen, New Taipei (TW); Po-Ying Chuang, Taipei (TW)

(73) Assignee: GOOGLE LLC, Mountain View, CA (US)

( * ) Notice: Subject to any disclaimer, the term of this patent is extended or adjusted under 35 U.S.C. 154(b) by 233 days.

(21) Appl. No.: 18/266,482

(22) PCT Filed: Dec. 10, 2021

(86) PCT No.: PCT/US2021/062944
§ 371 (c)(1),
(2) Date: Jun. 9, 2023

(87) PCT Pub. No.: WO2022/125981
PCT Pub. Date: Jun. 16, 2022

(65) Prior Publication Data
US 2024/0056944 A1     Feb. 15, 2024

Related U.S. Application Data

(60) Provisional application No. 63/124,460, filed on Dec. 11, 2020.

(51) Int. Cl.
*H04W 48/02*        (2009.01)
*H04W 36/00*        (2009.01)
(Continued)

(52) U.S. Cl.
CPC ..... *H04W 48/02* (2013.01); *H04W 36/00226* (2023.05); *H04W 36/144* (2023.05); *H04W 84/12* (2013.01)

(58) Field of Classification Search
CPC ......... H04W 36/00226; H04W 36/144; H04W 48/02; H04W 84/12
See application file for complete search history.

(56) References Cited

U.S. PATENT DOCUMENTS 9,906,992 B1     2/2018  Youtz et al.
2011/0183670 A1*  7/2011  Wu ....................... H04W 76/16
                                                  455/435.1
(Continued)

OTHER PUBLICATIONS

International Search Report and Written Opinion mailed Apr. 20, 2022 for PCT Application No. PCT/US2021/062944, 15 pages.
(Continued)

*Primary Examiner* — Brian P Cox

(57) ABSTRACT

A user equipment (UE) in a mobile network is configured to establish a first packet data network (PDN) connection between the UE and an Internet Protocol Multimedia Service (IMS) network of the mobile network via a wireless local area network (WLAN) access point. The first PDN connection is for implementing a voice call. The UE determines that at least one of the UE or the mobile network fails to support Voice over New Radio (VoNR). Responsive to determining that at least one of the UE or the mobile network fails to support Voice over New Radio (VoNR), the UE prevents itself from establishing a connection with a first radio access network (RAN) of the mobile network.

18 Claims, 8 Drawing Sheets

(51) Int. Cl.
   *H04W 36/14*   (2009.01)
   *H04W 84/12*   (2009.01)

(56)                  References Cited

U.S. PATENT DOCUMENTS

| 2015/0327129 | A1* | 11/2015 | Faccin | H04W 36/144 |
| | | | | 370/331 |
| 2019/0281647 | A1 | 9/2019 | Chiang et al. | |
| 2020/0015128 | A1 | 1/2020 | Stojanovski et al. | |
| 2020/0100309 | A1 | 3/2020 | Jha et al. | |
| 2020/0128449 | A1 | 4/2020 | Faus Gregori et al. | |
| 2020/0275259 | A1 | 8/2020 | Zhu et al. | |
| 2020/0314702 | A1 | 10/2020 | Rahman | |
| 2020/0323008 | A1 | 10/2020 | Pal et al. | |
| 2021/0136645 | A1* | 5/2021 | Zhao | H04W 36/30 |
| 2021/0153290 | A1* | 5/2021 | Ahmad | H04W 76/16 |
| 2023/0023828 | A1 | 1/2023 | Zhu et al. | |

OTHER PUBLICATIONS

Mitchell, Gavin, "Delivering 5G Voice Services—Part 2", https://www.mpirical.com/blog/delivering-5g-voice-services-part-2, Oct. 23, 2020, 4 pages.

International Preliminary Report on Patentability mailed Jun. 22, 2023 for International Application No. PCT/US2021/062944, 10 pages.

Qualcomm Incorporated, "Voice fallback triggered by PDU session resource setup", 3GPP TSG-RAN WG3 Meeting#107-BIS-e, R3-201785, Apr. 20-30, 2020, 5 pages.

Communication pursuant to Article 94(3) EPC mailed Sep. 3, 2025 for EP Application No. 21847802.2, 6 pages.

* cited by examiner

Figure 1:
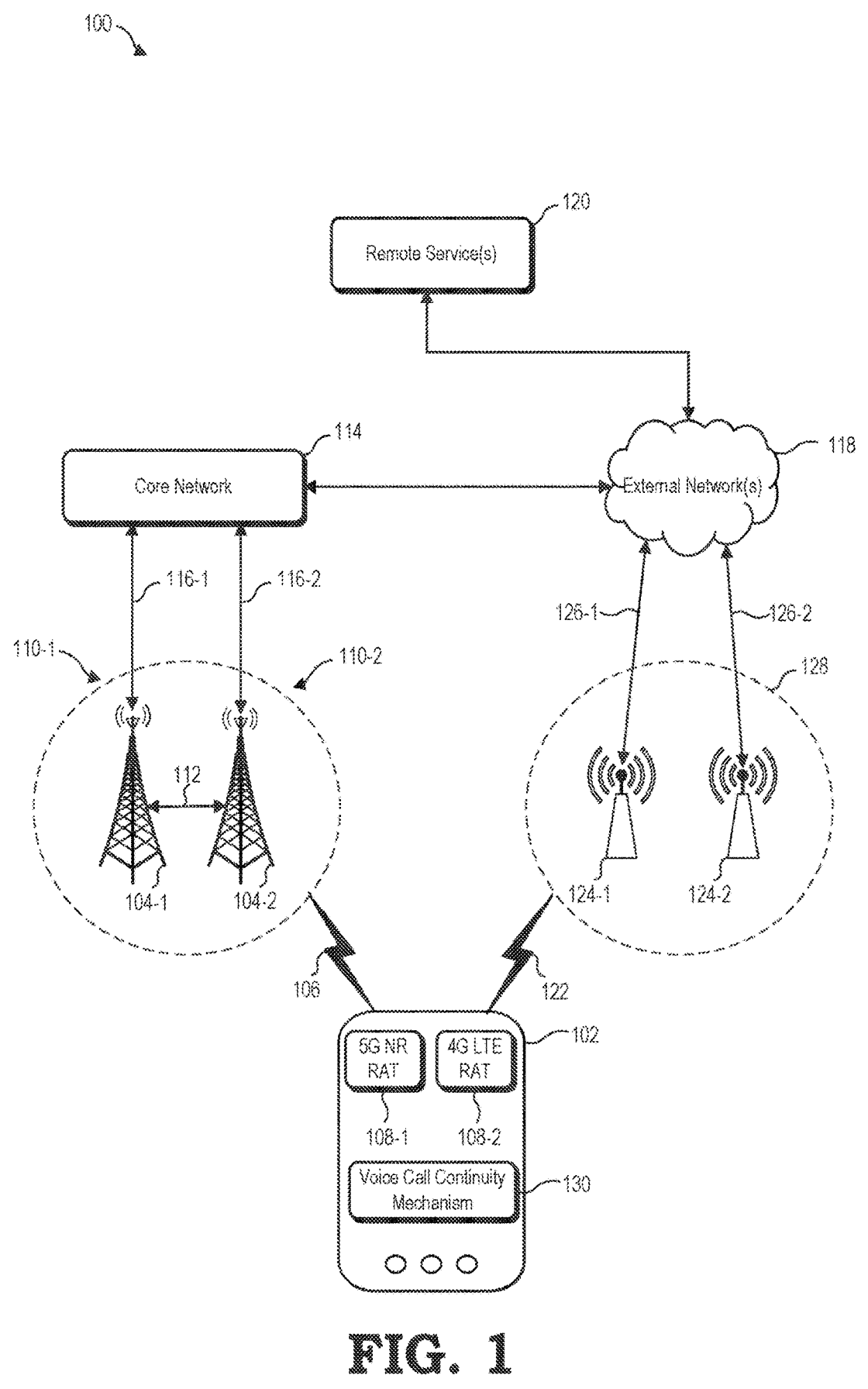

100

120 — Remote Service(s)

114 — Core Network

118 — External Network(s)

116-1    116-2

126-1    126-2

110-1    110-2    128

112

104-1    104-2

124-1    124-2

106    122

5G NR RAT    4G LTE RAT    102

108-1    108-2

Voice Call Continuity Mechanism    130

UE Device

304

504-1    RF Front End    504-2

Tx Front End    Rx Front End 506-1

LTE Modem 506-2

5G NR Modem

508

Sensor(s)

510

Processor

512

Computer-Readable Storage Media

Device Data    514

Applications    516

User Interface    518

Wireless Communication
Manager    520

Voice Call Continuity
Module    522

UE Voice Mode
Configuration Information    524-1

Network Voice Mode
Configuration Information    524-2

VOICE CALL CONTINUITY IN VOICE-OVER-Wi-Fi AND EVOLVED PACKET SYSTEM FALLBACK

CROSS-REFERENCE TO RELATED APPLICATIONS

The present application is a U.S. National Stage under 35 U.S.C. § 371 of International Patent Application Serial No. PCT/US2021/062944, entitled "VOICE CALL CONTINUITY IN VOICE-OVER-WI-FI AND EVOLVED PACKET SYSTEM FALLBACK" and filed on Dec. 10, 2021, which claims priority to U.S. Provisional Application No. 63/124,460, entitled "VOICE CALL CONTINUITY IN VOICE-OVER-WI-FI AND EPSFB" and filed on Dec. 11, 2020, the entireties of which are incorporated by reference herein.

BACKGROUND

Data-based voice calls in cellular networks rely on establishing a packet data network (PDN) connection for carrying the data packets containing voice content between a user equipment (UE) and a cellular network. However, as the UE is often mobile, mechanisms have been employed to permit inter-system transfer (that is, "handover") of the PDN, and thus the voice call, from one radio access network (RAN) to another RAN so that the call may continue even as the UE moves throughout the cellular network during the call. For example, the Third Generation Partnership Project (3GPP) Fifth Generation (5G) New Radio (NR) technology standards provide for an Evolved Packet System (EPS) fallback (FB) technique in which a UE, even though connected to a 5G core (5GC), may be switched over to using, for example, a 3GPP Fourth Generation (4G) Long Term Evolution (LTE) RAN for conducting a voice call when the 5G connection is not sufficient to conduct the voice call for any of a variety of reasons.

Efficient and effective handover operations are particularly compelling for voice calls initiated using, or otherwise implementing, Voice-over-WiFi (VoWiFi), in which a packet tunnel is established between the UE and a cellular core network via a wireless local area network (WLAN) based on one or more Wi-Fi technologies (that is, technologies based on one or more of the Institute of Electronic and Electrical Engineers (IEEE) 802.11 standards). This is partly because the relatively short range of the access points implemented in such WLANs makes inter-system handover likely. Further, current EPS fallback procedures for migrating from VoWiFi to Voice over NR (VoNR) in a 5G-enabled system require a two-handover approach in situations in which the network or UE do not support Voice over NR (VoNR). Such processes can introduce significant time gaps and even potential for disconnected calls if the 5G NR connection is not yet ready to support VoNR at the time of handover.

SUMMARY OF EMBODIMENTS

In accordance with one aspect, a method, performed at a UE in a mobile network. The UE establishes a first packet data network (PDN) connection between the UE and an Internet Protocol Multimedia Service (IMS) network of the mobile network via a wireless local area network (WLAN) access point. The first PDN connection is for implementing a voice call. The UE determines that at least one of the UE or the mobile network fails to support Voice over New Radio (VoNR). Responsive to determining that at least one of the UE or the mobile network fails to support Voice over New Radio (VoNR), the UE prevents itself from establishing a connection with a first radio access network (RAN) of the mobile network.

In at least some embodiments, the method further includes, responsive to determining current coverage provided by the WLAN access point is insufficient to continue supporting the first PDN connection, the UE implements a direct handover of the first PDN connection to a second RAN of the mobile network. The second RAN implements a different radio access technology than the first RAN.

In at least some embodiments, the first RAN is a Fifth Generation New Radio (5G NR) RAN, and the second RAN is a Fourth Generation (4G) Long Term Evolution (LTE) RAN.

In at least some embodiments, the UE prevents itself from establishing the connection with the first RAN by detaching the UE (102) from the first RAN (110-1).

In at least some embodiments, the UE prevents itself from establishing the connection with the first RAN by at least one: actively selecting a second RAN of the mobile network over the first RAN, the second RAN implementing a different radio access technology than the first RAN or disregarding detected cells of the first RAN.

In at least some embodiments, the UE prevents itself from establishing the connection with the first RAN by disabling one or more components of the UE that enable the UE to establish the connection with the first RAN.

In at least some embodiments, the UE preventing itself from establishing the connection with the first RAN includes preventing itself from establishing the connection with the first RAN while the first PDN connection is established. In at least some embodiments, the method further includes the UE determining that the first PDN connection has been handed over from the WLAN access point to one of the first RAN or a second RAN implementing a different radio access technology than the first RAN. Responsive to determining that the first PDN connection has been handed over, the UE re-enables its capability to establish the connection with the first RAN.

In at least some embodiments, the UE preventing itself from establishing the connection with the first RAN is further in response to determining that a voice call is currently active on the first PDN connection. In at least some embodiments, the method further includes the UE determining that the active call has terminated and, responsive to determining that the active call has terminated, the UE enables itself to establish the connection with the first RAN.

In at least some embodiments, the UE preventing itself from establishing the connection with the first RAN is further in response to determining that a Wireless Fidelity calling mode has been enabled at the UE. In at least some embodiments, the method further includes the UE determining that the Wi-Fi calling mode has been disabled and, responsive to determining that the Wi-Fi calling mode has been disabled, the UE enables itself to establish the connection with the first RAN.

In at least some embodiments, the method further includes the UE, responsive to detaching itself from the first RAN, handing over a second PDN connection established between the UE and the first RAN to a second RAN of the mobile network. The second RAN implements a different radio access technology than the first RAN and the second PDN connection is for establishing a data connection.

In accordance with another aspect, a user equipment device includes one or more radio frequency (RF) modems configured to wirelessly communicate with at least one network. One or more processors are coupled to the one or more RF modems. At least one memory stores executable instructions. The executable instructions are configured to manipulate at least one of the one or more processors or the one or more RF modems to perform any of the method operations described herein.

In accordance with yet another aspect, a computer-readable storage medium embodies a set of executable instructions. The set of executable instructions is to manipulate a computer system to perform any of the method operations described herein.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 1 is a diagram illustrating an example wireless communication system employing a user equipment (UE) device implementing one or more voice call continuity mechanisms in accordance with some embodiments.

DETAILED DESCRIPTION

Figure 2:
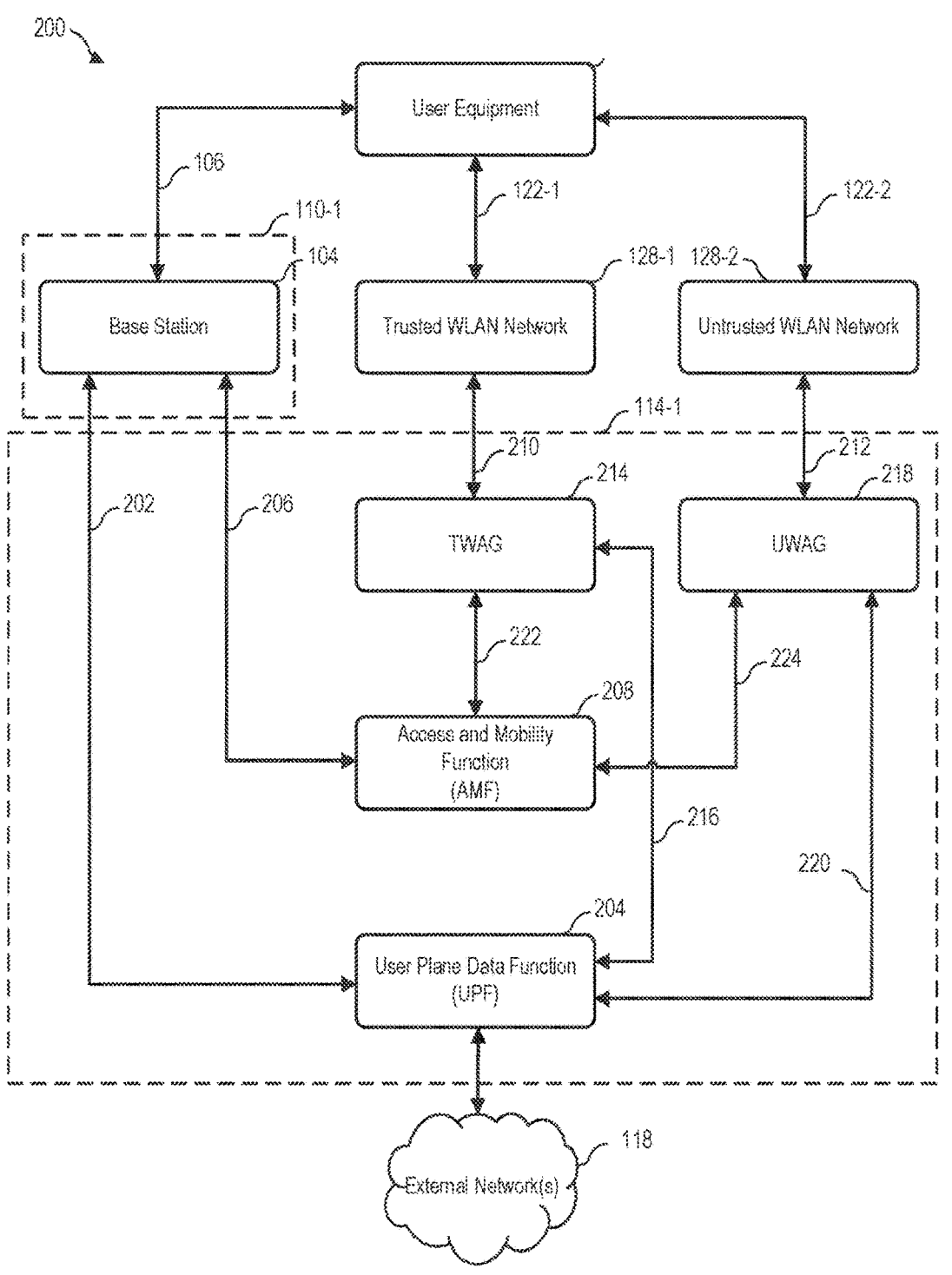
FIG. 2 is a block diagram illustrating an example environment that generally relates to a 5G NR cellular network and WLAN networks that can implement various aspects of a cellular-WLAN network interface in accordance with some embodiments.

As described in detail below, a UE, in at least some embodiments, employs one or more voice call continuity mechanisms to detect potential VoWiFi handover situations and avoid the two-handover step process typically performed by conventional mechanisms when the 5G NR RAN is not yet able to support VoNR. The voice call continuity mechanism disables the ability of the UE to establish a 5G NR connection entirely so that any handover of a PDN connection from a Wi-Fi network is performed directly to an LTE RAN, rather than via an intermediary handover from the Wi-Fi network to the 5G NR RAN and then from the 5G NR RAN to the LTE RAN. This approach implements a whole new path when insufficient Wi-Fi coverage is present to overcome otherwise problematic Wi-Fi to cellular handoffs.

For ease of illustration, the following techniques are described in an example context in which one or more UE devices and radio access networks (RANs) implement one or more radio access technologies (RATs), including at least a 5G NR standard (e.g., 3GPP Release 15, 3GPP Release 16, etc.) (hereinafter, "5G NR" or "5G NR standard") and a 4G LTE standard (e.g., 3GPP Release 9, 3GPP Release 10, etc.). However, it should be understood that the present disclosure is not limited to networks employing 5G NR RAT and 4G LTE RAT configurations, but rather the techniques described herein can be applied to any combination of different RATs employed at the UE devices and the RANs. It should also be understood that the present disclosure is not limited to any specific network configurations or architectures described herein for implementing voice call continuity mechanisms for VoWiFi calls. Instead, techniques described herein can be applied to any configuration of RANs. Also, the present disclosure is not limited to the examples and context described herein, but rather the techniques described herein can be applied to any network environment where a UE device implements voice call continuity techniques for VoWiFi calls.

FIG. 1 illustrates a mobile network (system) 100 in accordance with at least some embodiments. As shown, the mobile network 100 includes a user equipment (UE) device 102 that is configured to communicate with one or more base stations 104 (base stations 104-1 and 104-2) through one or more wireless communication links 106. The UE 102, in at least some embodiments, includes any of a variety of wireless communication devices, such as a cellular phone, a cellular-enabled tablet computer or cellular-enabled notebook computer, a cellular-enabled wearable device, an automobile, or other vehicle employing cellular services (e.g., for navigation, provision of entertainment services, in-vehicle mobile hotspots, etc.), and so on. In at least some embodiments, the UE 102 employs a single RAT 108. In other embodiments, the UE 102 is a multi-mode UE device that employs multiple RATs 108. Examples of multiple RATs include a 3GPP 5G NR RAT 108-1 and a 3GPP LTE RAT 108-2.

In at least some embodiments, the base stations 104 are implemented in a macrocell, microcell, small cell, picocell, and the like, or any combination thereof. Examples of base stations 104 include an Evolved Universal Terrestrial Radio Access Network Node B (E-UTRAN Node B), Evolved Node B (eNodeB or eNB), Next Generation (NG or NGEN) Node B (gNode B or gNB), and so on. The base stations 104 communicate with the UE 102 via the wireless links 106, which are implemented using any suitable type of wireless link. The wireless links 106, in at least some embodiments, include a downlink of data and control information communicated from the base stations 104 to the UE 102, an uplink of data and control information communicated from the UE 102 to the base stations 104, or both. The wireless links 106 (or bearers), in at least some embodiments, are implemented using any suitable communication protocol or standard, or combination of communication protocols or standards, such as 3GPP 4G LTE, 5G NR, and so on. In at least some embodiments, multiple wireless links 106 are aggregated in a carrier aggregation to provide a higher data rate for the UE 102. Also, multiple wireless links 106 from multiple base stations 104 are configured, in at least some embodiments, for coordinated multipoint (CoMP) communication with the UE 102, as well as dual connectivity, such as single-RAT LTE-LTE or NR-NR dual connectivity, or multi-radio access technology (Multi-RAT) dual connectivity (MR-DC) including E-UTRA-NR dual connectivity (EN-DC), NGEN radio access network (RAN) E-UTRA-NR dual connectivity (NGEN-DC), and NR E-UTRA dual connectivity (NE-DC).

The base stations 104 collectively form one or more Radio Access Networks 110, such as a 5G NR RAN 110-1 or an E-UTRAN 110-2. In at least some embodiments, the base stations 104 may communicate with each other via one or more interfaces 112, such as an Xn interface if the base stations 104 are 5G base stations or via an X2 interface if the base stations 104 are E-UTRA base stations.

The base stations 104 are also connected to a core network 114. The base stations 104 connect to the core network 114 via control-plane and user-plane interfaces through one or more links 116 (links 116-1 and 116-2). For example, the base stations 104 can connect to the core network 114 via an NG2 interface for control-plane signaling and an NG3 interface for user-plane data communications when connecting to 5G core network functions. In another example, the base stations 104 connect to EPC entities via an S1 interface for control-plane signaling and user-plane data communications when connecting to EPC core network entities.

The core network 114 includes either or both of entities or functions to support access and mobility for UEs 102. The core network 114 includes entities, functions, gateways, or a combination thereof that support connectivity to external networks 118 (e.g., the Internet, an Internet Protocol multimedia subsystem (IMS) network, and so on) and one or more remote services 120. The core network 114 is described in greater detail below with respect to FIG. 2 and FIG. 3. The RAN 110 and the core network 114, in at least some embodiments, are part of a cellular network of the mobile network 100.

In at least some embodiments, the UE 102 connects to one or more of the external networks 118 (e.g., the Internet, IMS network, and so on) using a WLAN connection 122 to a WLAN access point (AP) 124 (WLAN APs 124-1 and 124-2). The WLAN APs 124 are connected to the one or more of the external networks 118 via a network interface(s) 126 (interfaces 126-1 and 126-2). The WLAN APs 124 may be located in different locations, such as a user's home, an office, an airport, an outdoor area, and so on. Each WLAN AP 124 may be independently operated, such as in a user's home, may be part of a WLAN network 128, which is illustrated as including the WLAN APs 124. For example, a WLAN network 128, such as a Wireless Fidelity (Wi-Fi) network, may be an enterprise network or a public network of WLAN APs 124 operated by a wireless network operator. The WLAN network 128 operator may be the same as the operator of the RAN 110 or different from the operator of the RAN 110. If a WLAN network 128 is managed directly by the network operator, the WLAN network 128 is referred to as a trusted WLAN network.

Otherwise, the WLAN network 128 is referred to as an untrusted WLAN network 128.

Depending on the configuration of the mobile network 100, the core network 114 is either a 5G Core Network (5GC) 114-1 (FIG. 2), an Evolved Packet Core (EPC) network 114-2 (FIG. 3), or the like. FIG. 2 illustrates one example environment 200 in which the core network 114 is a 5G NR core network 114-1. The core network 114-1 of FIG. 2 may include additional functions and interfaces omitted from FIG. 2 for brevity. In at least some embodiments, the UE 102 connects to the base station 104 located within a 5G NR RAN 110-1 using various cellular radio access technologies, such as the wireless link 106. Additionally, the UE 102, in at least some embodiments, connects to a WLAN network 128, such as a trusted WLAN network 128-1 or an untrusted WLAN network 128-2, including one or more of the APs 124 using a WLAN connection 122, such as connections 122-1 and 122-2.

Interconnections between services or functions to the core network 114-1 and within the core network 114-1 are defined in terms of interfaces or reference points. User-plane data for the UE 102, when connected via the base station 104, is sent over a first interface 202 between the base station 104 and a User Plane Function (UPF) 204, which in turn is connected to one or more external networks 118 (e.g., the Internet, IMS network, and so on). Control-plane communications for the UE 102, when connected to the base station 104, are sent over a second interface 206 between the base station 104 and an Access and Mobility Management Function (AMF) 208. The AMF 208 provides control-plane functions such as registration and authentication of multiple UEs 102, authorization, mobility management, or the like in the 5G NR network.

The trusted WLAN network 128-1 and the untrusted WLAN network 128-2 are connected to the core network 114-1 by a third interface 210 and a fourth interface 212, respectively. The third interface 210 connects the trusted WLAN network 128-1 to a Trusted WLAN Access Gateway (TWAG) 214. A fifth interface 216 between the TWAG 214 and UPF 204 communicates user-plane data between the UE 102 and the one or more external networks 118 when the UE 102 is connected via the trusted WLAN network 128-1. The fourth interface 212 connects the untrusted WLAN network 128-2 to an Untrusted WLAN Access Gateway (UWAG) 218, such as a Non-3GPP Inter-Working Function (N3IWF). A sixth interface 220 between the UWAG 218 and UPF 204 communicates user-plane data between the UE 102 and the one or more external networks 118 when the UE 102 is connected via the untrusted WLAN network 128-2. A seventh interface 222 between the TWAG 214 and the AMF 208 and an eighth interface 224 between the UWAG 218 and the AMF 208 communicate requests, responses, commands, and procedures to add control-plane signaling over WLAN for integrating mobility management and network management between the cellular network and WLAN networks 128.

Figure 3:
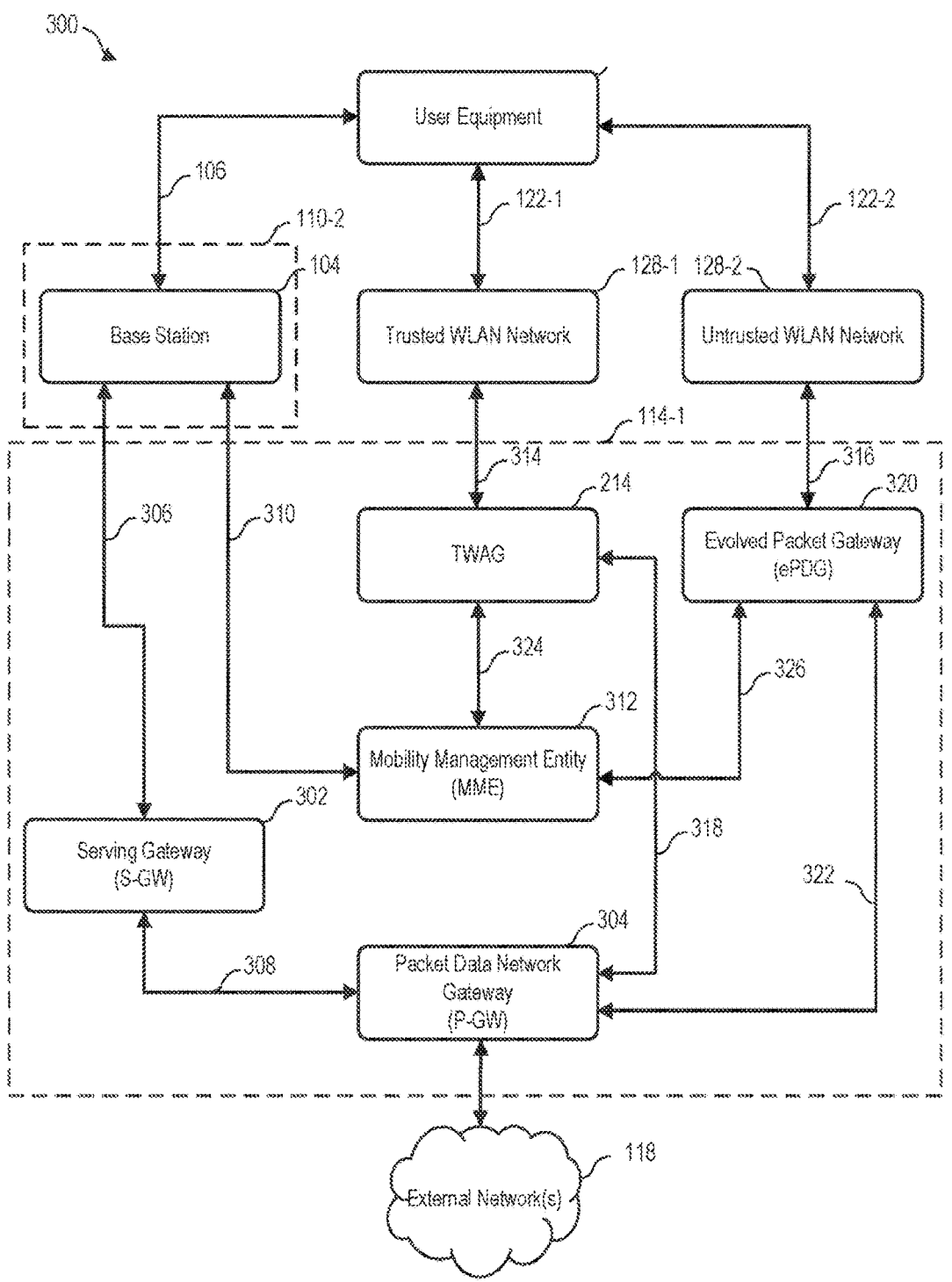
FIG. 3 is a block diagram illustrating an example environment that generally relates to an LTE cellular network and WLAN networks that can implement various aspects of a cellular-WLAN network interface in accordance with some embodiments.

FIG. 3 illustrates one example environment 300 in which the core network 114 is an EPC core network 114-2. The core network 114-2 may include additional entities, gateways, and interfaces that are omitted from FIG. 3 for purposes of brevity. In at least some embodiments, the UE 102 connects to the base station 104 located in a 4G (LTE) RAN 110-2 using various radio access technologies, such as the wireless link 106 and a cellular radio access technology. Additionally, the UE 102, in at least some embodiments, connects to a WLAN network 128, such as a trusted WLAN network 128-1 or an untrusted WLAN network 128-2, including one or more of the APs 124 using a WLAN connection 122, such as connections 122-1 and 122-2.

Interconnections between services or functions to the core network 114-2 and within the core network 114-2 are defined in terms of interfaces or reference points. User-plane data for the UE 102, when connected via the base station 104, is relayed via a Serving Gateway (S-GW) 302 to a Packet Data Network Gateway (P-GW) 304, which in turn is connected to one or more external networks 118 (e.g., the Internet, an IMS network, etc.). The base station 104 is connected to the S-GW 302 by a first interface 306, and the S-GW 302 is connected to the P-GW 304 by a second interface 308. Control-plane communications for the UE 102, when connected to the base station 104, are sent over a third interface 310 between the base station 104 and a Mobility Management Entity (MME) 312.

The trusted WLAN network 128-1 and the untrusted WLAN network 128-2 are connected to the core network 114-2 by a fourth interface 314 and a fifth interface 316, respectively. The fourth interface 314 connects the trusted WLAN network 128-1 to the TWAG 214. User-plane data for the UE 102, when connected via the trusted WLAN network 128-1, is sent over sixth interface 318 between the TWAG 214 and the P-GW 304, which is connected to the one or more external networks 118. The fifth interface 316 connects the untrusted WLAN network 128-2 to an Evolved Packet Data Gateway (ePDG) 320. User-plane data for the UE 102, when connected via the untrusted WLAN network 128-2, is sent over a seventh interface 322 between the ePDG 320 and the P-GW 304, which in turn is connected to the one or more external networks 118. An eighth interface 324 between the TWAG 214 and the MME 312 and a ninth interface 326 between the ePDG 320 and the MME 312 communicate requests, responses, commands, and procedures to add control-plane signaling over WLAN for integrating mobility management and network management between the cellular network and WLAN networks 128.

During the operation of a VoWiFi call, the UE 102 may move from sufficient Wi-Fi coverage to insufficient Wi-Fi coverage. In this situation, the typical approach is to hand over the supporting PDN connection from Wi-Fi to the 5G NR RAN. However, assuming VoNR is not yet supported at this stage of the handover, the handover can take one of two paths. If the network supports Wi-Fi to 5G NR handover, then an EPS fallback procedure is triggered, and the call will ultimately be resumed using the LTE RAN, by way of handover from Wi-Fi to the 5G NR RAN, and then handover from the 5G NR RAN to the LTE RAN. However, this two-handover process often can require up to four seconds to complete and, thus, introduce up to a four second time gap, or voice discontinuity, in the voice call, which negatively impacts the user experience. Even worse, however, is when the network does not support Wi-Fi to 5G NR handover. In such instances, the PDN connection is dismantled and, as a result, the voice call is disconnected suddenly.

Accordingly, in at least some embodiments, the UE 102 employs one or more voice call continuity (VCC) mechanisms 130 (FIG. 1) to detect potential VoWiFi handover situations and avoid the two-handover step process typically performed by conventional mechanisms when the 5G NR RAN is not yet able to support VoNR. Accordingly, the one or more voice call continuity mechanisms 130 reduce or mitigate the delay in Wi-Fi to cellular RAN handovers. As described in greater detail below, the VCC mechanism 130 includes one or more modes that actively detect whether VoNR is currently supported by the network 114 and the UE 102. If either of the network 114 or the UE 102 does not support VoNR, the VCC mechanism 130 disables the ability of the UE 102 to establish a 5G NR connection entirely so that any handover of a PDN connection from Wi-Fi is performed directly to an LTE RAN, rather than via an intermediary handover from Wi-Fi to the 5G NR RAN and then from the 5G NR RAN to the LTE RAN. This approach implements a whole new path when insufficient Wi-Fi coverage is present to overcome otherwise problematic Wi-Fi to cellular handoffs.

Figure 4:
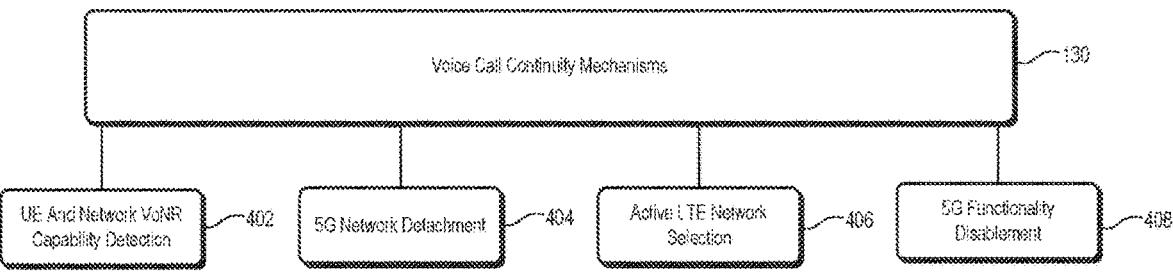
FIG. 4 is a block diagram illustrating example modes of a mechanism employed by the UE of FIG. 1 for maintaining voice continuity for a VoWiFi call during inter-RAT handover situations in accordance with some embodiments.

FIG. 4 illustrates various example modes or configurations employed singularly or in various combinations by the UE 102 as part of the VCC mechanism 130 in accordance with some embodiments. Each of these modes is discussed in greater detail below with respect to FIGS. 6 to 8. These modes may be provided individually, or one or more of the modes may be provided in any suitable combination as part of the VCC mechanism 130. One such mode includes a UE and network VoNR capability detection mode 402. In this mode, the voice call continuity mechanism 130 detects the capabilities of one or both of the UE 102 or the network 114 and determines if either of the UE 102 or the network 114 support VoNR. In at least some embodiments, the VCC mechanism 130 determines the VoNR capabilities of the UE 102 based on one or more of a software (SVV) configuration of the UE 102, a hardware (HVV) configuration of the UE 102, the default values from source code, and so on. For example, the VCC mechanism 130 reads the external file system (EFS) or the non-volatile (NV) random-access memory (RAM) of the UE 102 to obtain one or more of a software (SW) configuration(s) or hardware (HW) configuration(s) of the UE 102. The VCC mechanism 130 processes the SW/HW configuration(s) to determine if the UE 102 supports VoNR. The VCC mechanism 130, in at least some embodiments, determines the VoNR capabilities of the network 114 (e.g., VoNR-supported, EPSFB-supported, no voice service supported, etc.) based on information maintained by the UE 102 in an internal file, database, or other data structure. In at least some embodiments, the internal file or database is pre-configured by the network 114 (or other entity), manually configured by a user (or other entity) with network VoNR capability information, or a combination thereof. The UE 102, in at least some embodiments, also receives over-the-air (OTA) messages from the network 114 indicating the network's VoNR capabilities and stores at least an indication of the received VoNR capabilities in the internal file, database, or other data structure. In at least some embodiments, the UE 102 learns or determines the VoNR capabilities of the network 114 based on interactions with the network 114 during runtime and stores at least an indication of the learned/determined VoNR capabilities in the internal file, database, or other data structure.

If VoNR is not supported by either the UE 102 or the network 114, the VCC mechanism 130 includes one or more additional modes to disable the 5G NR connection for purposes of potential PDN handover. One such mode includes a 5G network detachment mode 404. In this mode, the VCC mechanism 130 configures the UE 102 to detach from the 5G NR RAN 110-1 and then attach to the LTE RAN 110-2. The VCC mechanism 130 further configures the UE 102 to establish the data-PDN connection, which was previously established on 5G NR network 114-1, on the 4G LTE network 114-2. Another mode includes an active LTE network selection mode 406 via the LTE RAN 110-2. In this mode, the VCC mechanism 130 configures the UE 102 to trigger itself to actively select the 4G LTE network 114-2 rather than the 5G NR network 114-1 for voice and data communications. For example, the UE 102 uses one or more forcing commands or intentionally disregards the surrounding 5G NR cells to actively select and establish a connection with the 4G LTE network 114-2 via the 4G LTE RAN 110-2. Yet another mode includes a 5G functionality disablement mode. In this mode, the voice call continuity mechanism 130 configures the UE 102 to remove/disable its 5G NR functionality such that the UE 102 selects the 4G LTE network 114-2 for voice and data communications. In at least some embodiments, removing/disabling the UE 5G NR functionality includes, for example, disabling hardware components, such as the 5G NR radio frequency (RF) front end or antenna(s)), disabling software components, such as any of the 5G NR protocol layers, a combination thereof, and so on.

Figure 5:
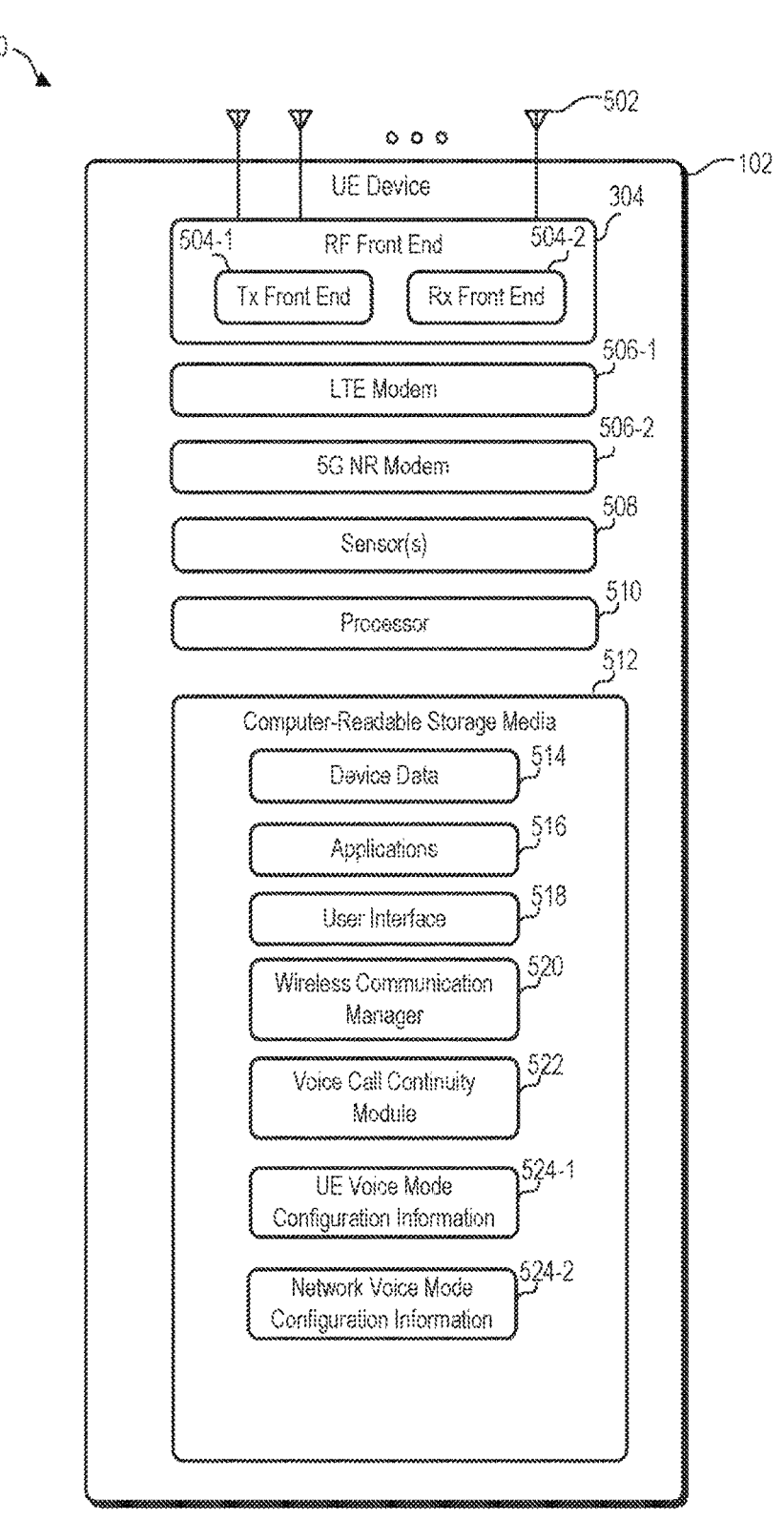
FIG. 5 is a diagram illustrating an example configuration of a UE implementing one or more voice call continuity mechanisms in accordance with some embodiments.

FIG. 5 illustrates an example device diagram 500 of a UE 102. In at least some embodiments, the device diagram 500 describes a UE 102 that implements various aspects of maintaining voice call continuity for VoWiFi calls in Wi-Fi to cellular RAN handover situations. The UE 102 may include additional functions and interfaces that are omitted from FIG. 5 for the sake of clarity. The UE 102, in at least some embodiments, includes antennas 502, an RF front end 504, and one or more RF transceivers 506 (e.g., a 3GPP 4G LTE transceiver 506-1 and a 5G NR transceiver 506-2) for communicating with one or more base stations 104 in a RAN 110, such as a 5G RAN, an E-UTRAN, a combination thereof, and so on. The RF front end 504, in at least some embodiments, includes a transmitting (Tx) front end 504-1 and a receiving (Rx) front end 504-2. The Tx front end 504-1 includes components such as one or more power amplifiers (PA), drivers, mixers, filters, and so on. The Rx front end 504-2 includes components such as low-noise amplifiers (LNAs), mixers, filters, and so on. The RF front end 504, in at least some embodiments, couples or connects the one or more transceivers 506, such as the LTE transceiver 506-1 and the 5G NR transceiver 506-2, to the antennas 502 to facilitate various types of wireless communication.

In at least some embodiments, the antennas 502 of the UE 102 include an array of multiple antennas configured similar to or different from each other. The antennas 502 and the RF front end 504, in at least some embodiments, are tuned to or are tunable to one or more frequency bands, such as those defined by the 3GPP LTE, 3GPP 5G NR, IEEE wireless local area network (WLAN), IEEE wireless metropolitan area network (WMAN), or other communication standards. In at least some embodiments, the antennas 502, the RF front end 504, the LTE transceiver 506-1, and the 5G NR transceiver 506-2 are configured to support beamforming (e.g., analog, digital, or hybrid) or in-phase and quadrature (I/Q) operations (e.g., I/Q modulation or demodulation operations) for the transmission and reception of communications with one or more base stations 104. By way of example, the antennas 502 and the RF front end 504 operate in sub-gigahertz bands, sub-6 GHz bands, above 6 GHz bands, or a combination of these bands defined by the 3GPP LTE, 3GPP 5G NR, or other communication standards.

In at least some embodiments, the antennas 502 include one or more receiving antennas positioned in a one-dimensional shape (e.g., a line) or a two-dimensional shape (e.g., a triangle, a rectangle, or an L-shape) for implementations that include three or more receiving antenna elements. While the one-dimensional shape enables the measurement of one angular dimension (e.g., an azimuth or an elevation), the two-dimensional shape enables two angular dimensions to be measured (e.g., both azimuth and elevation). Using at least a portion of the antennas 502, the UE 102 can form beams that are steered or un-steered, wide or narrow, or shaped (e.g., as a hemisphere, cube, fan, cone, or cylinder). The one or more transmitting antennas may have an un-steered omnidirectional radiation pattern or may produce a wide steerable beam. Either of these techniques enables the UE 102 to transmit a radio signal to illuminate a large volume of space. In some embodiments, the receiving antennas generate thousands of narrow steered beams (e.g., 2000 beams, 4000 beams, or 6000 beams) with digital beamforming to achieve desired levels of angular accuracy and angular resolution.

The UE 102, in at least some embodiments, includes one or more sensors 508 implemented to detect various properties such as one or more of temperature, supplied power, power usage, battery state, or the like. Examples of sensors include a thermal sensor, a battery sensor, a power usage sensor, and so on.

The UE 102 also includes at least one processor 510. The processor 510, in at least some embodiments, is a single-core processor or a multiple-core processor composed of a variety of materials, such as silicon, polysilicon, high-K dielectric, copper, and so on. In at least some embodiments, the processor 510 is implemented at least partially in hardware including, for example, components of an integrated circuit or a system-on-a-chip (SoC), a digital-signal-processor (DSP), an application-specific integrated circuit (ASIC), a field-programmable gate array (FPGA), a complex programmable logic device (CPLD), other implementations in silicon or other hardware, or a combination thereof.

Examples of the processor(s) 510 include a communication processor, an application processor, microprocessors, DSPs, controllers, and so on. A communication processor, in at least some embodiments, is implemented as a modem baseband processor, software-defined radio module, configurable modem (e.g., multi-mode, multi-band modem), wireless data interface, wireless modem, or so on. In at least some embodiments, a communication processor supports one or more of data access, messaging, or data-based services of a wireless network, as well as various audio-based communication (e.g., voice calls). An application processor, in at least some embodiments, provides computing resources to applications executing on the UE 102. For example, an application provides a self-contained operating environment that delivers system capabilities (e.g., graphics processing, memory management, and multimedia processing) to support applications executing on the UE 102.

The UE 102 further includes a non-transitory computer-readable storage media 512 (CRM 512). The computer-readable storage media described herein excludes propagating signals. The CRM 512, in at least some embodiments, includes any suitable memory or storage device such as random-access memory (RAM), static RAM (SRAM), dynamic RAM (DRAM), non-volatile RAM (NVRAM), read-only memory (ROM), or Flash memory useable to store device data 514 of the UE 102. In at least some embodiments, the device data 514 includes user data, multimedia data, beamforming codebooks, applications 516, a user interface(s) 518, an operating system of the UE 102, and so on, which are executable by the processor(s) 510 to enable user-plane communication, control-plane signaling, and user interaction with the UE 102. The user interface 518, in at least one embodiment, is configured to receive inputs from a user of the UE 102, such as to receive input from a user that defines and or facilitates one or more aspects of voice call continuity for VoWiFi calls. In at least some embodiments, the user interface 518 includes a graphical user interface (GUI) that receives the input information via a touch input. In other instances, the user interface 518 includes an intelligent assistant that receives the input information via an audible input or speech. Alternatively, or additionally, the operating system of the UE 102 is maintained as firmware or an application on the CRM 512 and executed by the processor(s) 510.

The CRM 512, in at least some embodiments, also includes either or both of a communication manager 520 and a voice call continuity (VCC) module 522. Alternatively, or additionally, either or both of the communication manager 520 and the VCC module 522, in at least some embodiments, are implemented in whole or part as hardware logic or circuitry integrated with or separate from other components of the UE 102. In at least some embodiments, the communication manager 520 configures the RF front end 504, the LTE transceiver (modem) 506-1, the 5G NR transceiver (modem) 506-2, or a combination thereof, to perform one or more wireless communication operations.

The VCC module 522, in at least some embodiments, implements the voice call continuity mechanism(s) 130 for maintaining voice call continuity for VoWiFi calls in Wi-Fi to cellular network handover situations. For example, the VCC module 522 is configured to detect potential VoWiFi handover situations and avoid the two-handover step process in situations in which the 5G NR network 114-1 is not yet able to support VoNR. In at least some embodiments, the communication manager 520 performs one or more functions of the VCC module 522 described herein. Alternatively, or additionally, the VCC module 522 performs one or more functions of the communication manager 520 described herein.

In at least some embodiments, the CRM 512 further includes voice mode configuration information 524, shown as UE voice mode configuration information 524-1 and network voice mode configuration information 524-2. The voice mode configuration information 524 indicates, for example, if the UE 102 and the network 114 support VoNR or do not support VoNR (e.g., supports EPS fallback). In at least some embodiments, the voice mode configuration information 524 is obtained from an internal file/database or other data structure maintained by the UE 102, pre-configured by the network 114 (or other entity), manually configured by a user (or other entity), obtained from over-the-air (OTA) messages from the network 114, learned or determined by the UE 102 based on interactions with the network 114 during runtime, a combination thereof, and so on.

Figure 6:
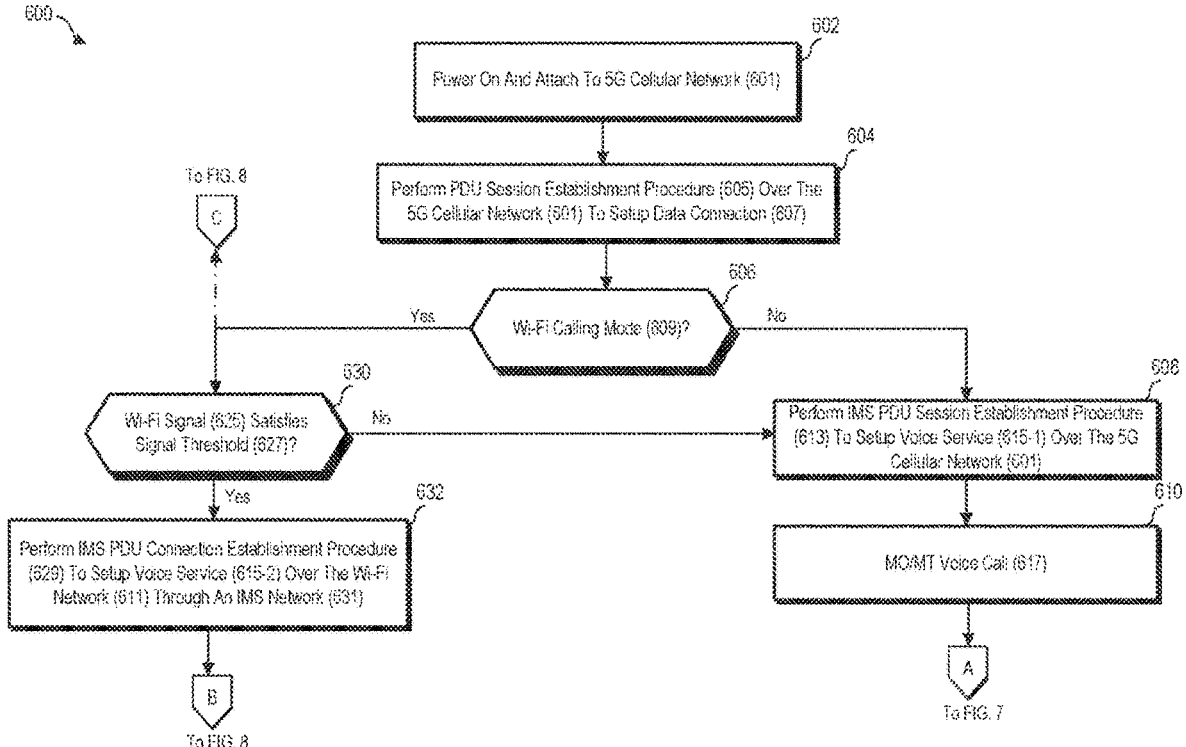
FIG. 6 to FIG. 8 together illustrate a diagram of an example operation of maintaining voice call continuity for a VoWiFi call at a UE during handover situations in accordance with some embodiments.
Figure 7:
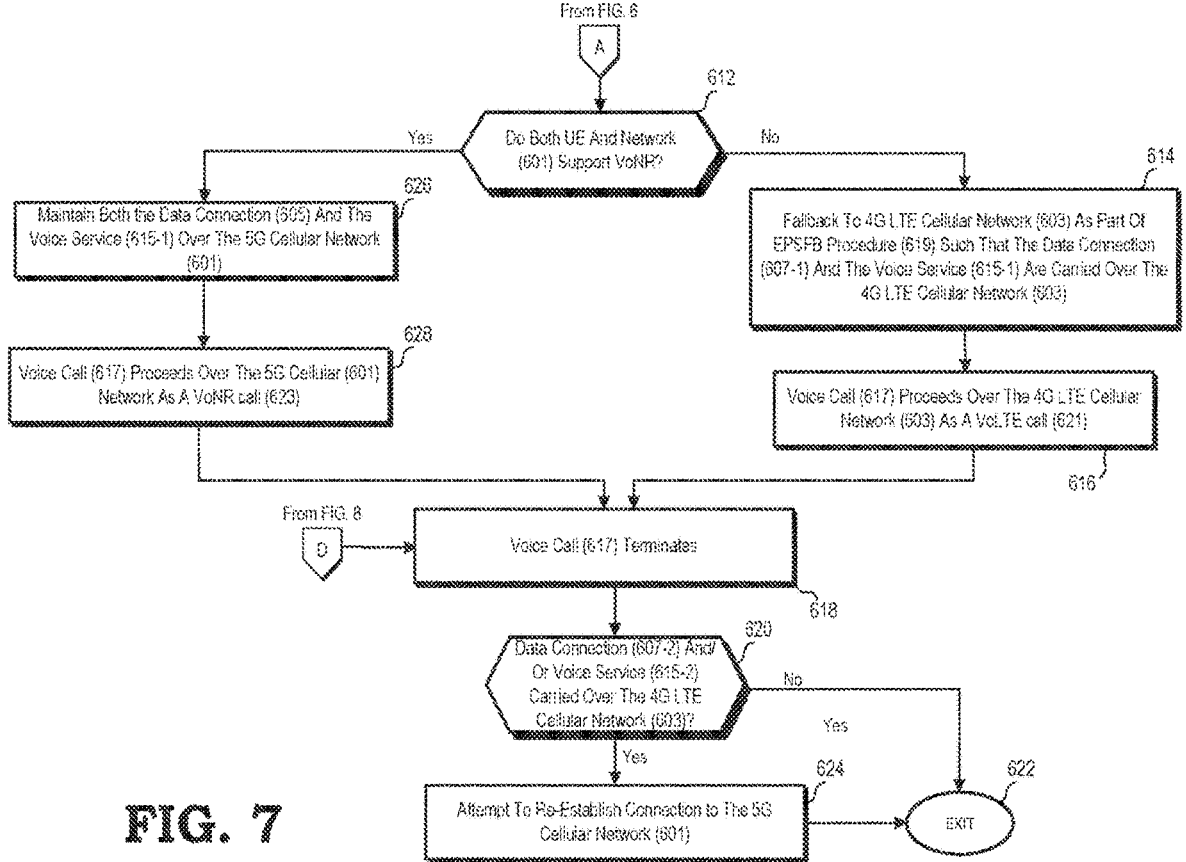
Figure 8:
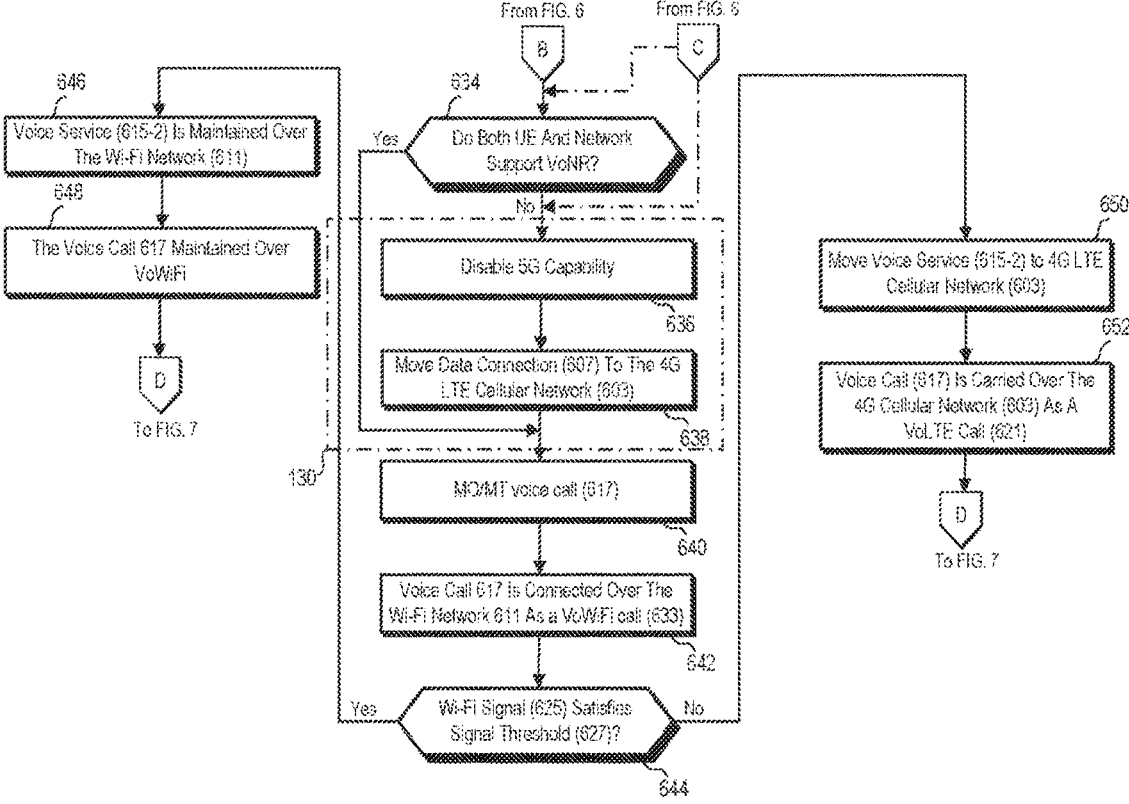

FIG. 6 to FIG. 8 together illustrate, in flow chart form, one example method 600 of a UE 102 maintaining voice call continuity for a VoWiFi call in Wi-Fi to cellular network handover situations. In this example, method 600 begins at block 602 with the UE 102 powering on and attaching to a mobile network 100. The mobile network 100, in at least some embodiments, includes a 5G cellular network 601 employing a 5GC Network 114-1 and an underlying 4G LTE cellular network 603 employing an EPC network 114-2. The UE 102 attaches to the 5G network 601 upon power-up via the 5G NR RAN 110-1 using one or more known mechanisms, which are not discussed in detail for purposes of brevity. At block 604, the UE 102 performs one or more known PDU session establishment procedures 605 to set up a data connection (data-PDU-session) 607-1 over the 5G cellular network 601. At block 606, the VCC module 522 of the UE 102, in at least some embodiments, determines if a Wi-Fi calling mode 609 is enabled on the UE 102 or if the UE 102 is Wi-Fi call capable such that the UE 102 is configured to establish voice calls over a Wi-Fi network 611. The VCC module 522, in at least some embodiments, determines that a Wi-Fi calling mode 609 is enabled (or the UE 102 is Wi-Fi calling capable) based on monitoring a software configuration of the UE 102, monitoring the user interface (UI) of the UE 102 to determine if a Wi-Fi call option has been enabled, and so on.

At block 608, if the Wi-Fi calling mode 609 is not enabled (or the UE 102 is not Wi-Fi call capable), the VCC module 522 (or another module of the UE 102) configures the UE 102 to perform one or more known IMS PDU session establishment procedures 613 to setup a voice service (IMS-PDU-session) 615-1 over the 5G cellular network 601. As such, at this point in the method 600, both the data-PDU-session 607-1 and the IMS-PDU-session 615-1 are both carried over the 5G cellular network 601. At block 610, the UE 102 initiates a voice call 617 (mobile originating (MO)) or receives an incoming voice call 617 (mobile terminating (MT)). At block 612 (FIG. 7), the VCC module 522 determines if the UE 102 and the 5G cellular network 601 each support VoNR. For example, responsive to initiating/receiving the MO/MT voice call 617, the VCC module 522 analyzes voice mode configuration information 524, such as the UE voice mode configuration information 524-1 and the network voice mode configuration information 524-2, to determine if both the UE 102 and the 5G cellular network 601 support VoNR.

At block 614, if both the UE 102 and the 5G cellular network 601 do not support VoNR, UE 102 performs one or more known EPS fallback procedures 619, such that both the data connection (data-PDU-session) 607-1 and the voice service (IMS-PDU-session) 615-1 are carried over the 4G LTE cellular network 603 as a corresponding LTE data-PDN connection 607-2 and IMS-PDN connection 615-2. The data connection (data-PDU-session) 607-1 and the voice service (IMS-PDU-session) 615-1 may be transferred from the 5G cellular network 601 to the 4G LTE cellular network 603 using, for example, standardized procedures, such as release with redirect or inter-system handover. At block 616, the voice call 617 proceeds over the 4G LTE cellular network 603 as a VoLTE call 621. At block 618, the voice call 617 terminates. At block 620, the VCC module 522 (or another module of the UE 102) determines if the UE 102 is currently operating over the 4G LTE cellular network 603, e.g., one or both of the data connection 607-2 or the voice service 615-2 are being carried over the 4G LTE cellular network 603. At block 622, if the UE 102 is currently operating over the 5G cellular network 601, the process ends or may return to another part of the process, such as block 604. At block 624, if the UE 102 is currently operating over the 4G LTE cellular network 603, the UE 102 performs one or more known procedures to re-establish a connection to the 5G cellular network 601. The process then ends at block 622 or may return to another part of the process, such as block 604.

Returning to block 612, if the VCC module 522 determines that both the UE 102 and the 5G cellular network 601 support VoNR, then, at block 626, the VCC module 522 maintains both the data connection (data-PDU-session) 607-1 and the voice service (IMS-PDU-session) 615-1 over the 5G cellular network 601. At block 628, the voice call 617 proceeds over the 5G cellular network 601 as a VoNR call 623. The flow proceeds to block 618, and the voice call 617 terminates. The operations at one or more of blocks 620 to 624 are then performed as described above.

Returning to block 606 of FIG. 6, if the VCC module 522 determines that a Wi-Fi calling mode 609 is enabled at the UE 102 or the UE 102 is Wi-Fi call capable, the process continues to block 630. At block 630, the VCC module 522 determines if a current Wi-Fi signal 625 satisfies a signal threshold 627. For example, the VCC module 522 determines if the strength of the Wi-Fi signal 625 satisfies a signal strength threshold. If the Wi-Fi signal 625 does not satisfy the signal threshold 627, a VoWiFi call is not initiated/established, and the process proceeds to block 608. Otherwise, at block 632, the VCC 522 (or another module of the UE 102) configures the UE 102 to perform one or more known IMS PDN connection establishment procedures 629 to set up a voice service (IMS-PDN connection) 615-2 over the Wi-Fi network 611. For example, the voice service (IMS-PDN connection) 615-2 is established between the UE 102 and an IMS network 631 via a WLAN AP 124 providing a WLAN network 128 (e.g., Wi-Fi network 611). As such, at this point in the method 600, the data connection (data-PDU-session) 607-1 is carried over the 5G cellular network 601, and the voice service (IMS-PDN connection) 615-2 is carried over the Wi-Fi network 611 through a tunnel, such as an Internet Protocol security (IPsec) tunnel.

At block 634 (FIG. 8), the VCC module 522 determines if the UE 102 and the 5G cellular network 601 each support VoNR. For example, the VCC module 522 analyzes voice mode configuration information 524, such as the UE voice mode configuration information 524-1 and the network voice mode configuration information 524-2, to determine if both the UE 102 and the 5G cellular network 601 support VoNR. If both the UE 102 and the 5G cellular network 601 support VoNR, the UE 102 maintains the data connection (data-PDU-session) 607-1 over the 5G cellular network 601 and the voice service (IMS-PDN connection) 615-2 over the Wi-Fi network 611 and the process flows to block 640. However, if either the UE 102 or the 5G cellular network 601 do not support VoNR, the VCC module 522 activates one or more of the voice call continuity mechanisms 130 and, at block 636, to disable the UE's 5G NR capability, such as the UE's 5G NR SA capability. In other words, activating one or more of the voice call continuity mechanisms 130 prevents the UE 102 from establishing or maintaining a connection with the 5G NR RAN 110-1 and, thus, the 5G cellular network 601.

For example, the VCC module 522 activates the 5G network detachment mode 404 such that the UE 102 detaches from the 5G NR RAN 110-1 and then attaches to the LTE RAN 110-2. In another example, the VCC module 522 activates the LTE network selection mode 406 such that the UE 102 triggers itself to actively select the 4G LTE cellular network 603 over the 5G cellular network 601 for voice and data communications. For example, the UE 102 uses one or more forcing commands or intentionally disregards the surrounding 5G NR cells to actively select the 4G LTE cellular network 603. In yet another example, the VCC module 522 activates the 5G functionality disablement mode 408 such that the UE 102 removes/disables its 5G NR functionality, causing the UE 102 to select the 4G LTE cellular network 603 for voice and data communications. In at least some embodiments, removing/disabling the UE 5G NR functionality includes, for example, disabling hardware components, such as the 5G NR radio frequency (RF) front end or antenna(s), disabling software components, such as any of the 5G NR protocol layers, a combination thereof, and so on. Also, in at least some embodiments, the mobile network 100 is configured to operate in a 5G NSA mode and a 5G SA mode. In these embodiments, the VCC module 522 disables the UE's 5G NR SA capabilities, but the UE 102 still maintains its 5G NR NSA capabilities. Therefore, the UE 102 is still able to use the 5G NR RAN 110-1 to enhance the data connection 607.

In at least some embodiments, if the VCC module 522 makes the determination at block 634 while a VoWiFi call is currently active, the VCC module 522 waits until the current VoWiFi call terminates to proceed with disabling the UE's 5G capability at block 636. The VCC module 522, in at least some embodiments, re-enables the UE's 5G NR capability once the IMS-PDN connection 615-2 has been handed over to a cellular network.

As part of the voice call continuity mechanism 130, the VCC module 522, at block 638, moves the data connection (data-PDU-session) 607-1 from the 5G cellular network 601 to the 4G LTE cellular network 603. For example, when the UE 102 detaches from the 5G cellular network 601, the data connection (data-PDU-session) 607-1 is released and the UE 102 re-establishes the data connection 607-2 as a data-PDN connection after the UE 102 attaches to the 4G LTE cellular network 603. In another example, when the UE 102 actively/forcibly selects the 4G LTE cellular network 603 or when the UE 102 disables its 5G NR SA capability, the UE 102 sends an OTA message, such as a Tracking Area Update (TAU) request to notify the mobile network 100 that the UE 102 is now in coverage of the 4G LTE cellular network 603. If the mobile network 100 responds with a TAU-Accept message, that mobile network 100 has already transferred the data connection 607-1 from the 5G PDU session to the LTE PDN connection 607-2 and the UE 102 does not need to re-establish the data connection 607.

In at least some embodiments, the VCC module 522 activates one or more of the voice call continuity mechanisms 130 prior to the IMS-PDN connection 615-2 being established over the Wi-Fi network 611 at block 632. For example, if the VCC module 522 determines at block 606 that a Wi-Fi calling mode 609 is enabled or if the UE 102 is Wi-Fi call capable, the flow can directly proceed to block 636 at which the VCC module 522 activates one or more of the voice call continuity mechanisms 130 described above. A user toggling/enabling the Wi-Fi calling mode 609 in the UI can trigger the VCC module 522 to activate the one or more of the voice call continuity mechanisms 130. The VCC module 522, in at least some embodiments, re-enables the UE's 5G NR capability responsive to the Wi-Fi calling mode 609 being disabled. Alternatively, if the VCC module 522 determines at block 606 that a Wi-Fi calling mode 609 is enabled or if the UE 102 is Wi-Fi call capable, the flow can directly proceed to block 634 and the VCC module 522 determines if both the UE 102 and the 5G cellular network 601 support VoNR. If so, the VCC module 522 maintains the 5G capability of the UE 102 and the flow proceeds to block 640. Otherwise, the flow proceeds to block 636 and the VCC module 522 disables the 5G capability of the UE 102. As such, even if the IMS connection is over the 5G cellular network 601 compared to the Wi-Fi network 611, VCC module 522 still disables the 5G capability of the UE 102. Stated differently, the VCC module 522 disables the 5G capability of the UE 102 before the IMS PDN is established over the Wi-Fi network 611. In another example, the VCC module 522 activates one or more of the voice call continuity mechanisms 130 responsive to a voice call being connected over the Wi-Fi network 611 (block 642). The VCC module 522, in at least some embodiments, re-enables the UE's 5G NR capability responsive to the voice call terminating over the Wi-Fi network 611.

At block 640, the UE 102 initiates/receives a voice call 617. At block 642, the voice call 617 is connected over the Wi-Fi network 611 as a VoWiFi call 633. At block 644, the VCC module 522 monitors the Wi-Fi signal 625 associated with the VoWiFi call and determines if the Wi-Fi signal 625 satisfies a signal threshold 627, such as a signal strength threshold. For example, in some situations, the Wi-Fi signal 625 associated with the VoWiFi call 633 may weaken or degrade such that the VoWiFi call may drop or at least experience a loss in quality. The VCC module 522 monitors the Wi-Fi signal 625 to detect these situations so that the voice call can be maintained. At block 646, if the Wi-Fi signal 625 satisfies the signal threshold 627, the UE 102 maintains the voice service (IMS-PDN connection) 615-2 over the Wi-Fi network 611. At block 648, the voice call 617 continues as a VoWiFi call 633. The process then flows to block 618 (FIG. 7) described above.

If the Wi-Fi signal 625 does not satisfy the signal threshold 627, conventional mechanisms typically attempt to hand over the IMS-PDN 615-2 from the Wi-Fi network 611 to the 5G cellular network 601. However, in some instances, the 5G cellular network 601 does not support PDN handover from the Wi-Fi network 611 to the 5G cellular network 601. As such, the voice service (IMS-PDU-session) 615-1 is dismantled and, as a result, the voice call 617 is disconnected suddenly. Furthermore, even if the 5G cellular network 601 supports PDN handover from the Wi-Fi network 611, either or both of the UE 102 or the 5G cellular network

601 may not support VoNR at this stage of the handover. In this situation, conventional mechanisms typically trigger the EPS fallback procedure 619 described above with respect to FIG. 6 to move both the data connection (data-PDU-session) 607-1 and voice service (IMS-PDU-session) 615-1 from the 5G cellular network 601 to the 4G LTE cellular network 603 so that the voice call 617 can continue over the 4G LTE cellular network 603. However, this two-handover process often can require up to four seconds to complete, e.g., up to two seconds for moving the voice service (IMS-PDU-session) 615-1 from the Wi-Fi network 611 to the 5G cellular network 601 and up to two seconds for moving the UE 102 to the 4G LTE cellular network 603. Thus, conventional mechanisms introduce up to a four second time gap, or voice discontinuity, in the voice call 617, which negatively impacts the user experience.

However, the VCC module 522 disables the UE's 5G capability and moves the connection (data-PDU-session) 607-1 from the 5G cellular network 601 to the 4G LTE cellular network 603 prior to block 644, as described above with respect to blocks 636 and 638. As such, at block 650, the VCC module 522 only needs to move the voice service (IMS-PDN connection) 615-2 from the Wi-Fi network 611 to the 4G LTE cellular network 603 when the Wi-Fi signal 625 does not satisfy the signal threshold 627. In other words, any handover of the IMS-PDN connection 615-2 from the Wi-Fi network 611 is performed directly to the 4G LTE cellular network 603, rather than via the conventional intermediary handover from the Wi-Fi network 611 to the 5G cellular network 601 and then from the 5G cellular network 601 to the 4G LTE cellular network 603. This approach prevents the sudden disconnection of the voice call 617 when the 5G cellular network 601 does not support PDN handover from the Wi-Fi network 611 and maintains voice continuity by reducing the time gap typically experienced by conventional mechanisms that perform EPS fallback procedures. At block 652, the voice call 617 is carried over the 4G LTE network 603 as a VoLTE call 637. The process then flows to block 622 (FIG. 7) described above.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium or combination of storage media accessible by a computer system during use to provide instructions and or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or universal serial bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified, and all such variations are considered within the scope of the disclosed subject matter. Accordingly, the protection sought herein is as set forth in the claims below.

What is claimed is:

1. A method by a user equipment (UE) in a mobile network, comprising:
    establishing a first packet data network (PDN) connection between the UE and an Internet Protocol Multimedia Service (IMS) network of the mobile network via a wireless local area network (WLAN) access point, the first PDN connection for implementing a voice call; and
    responsive to at least one of the UE or the mobile network failing to support Voice over New Radio (VoNR), preventing the UE from establishing a connection with a first radio access network (RAN) of the mobile network; and
    responsive to the first PDN connection having been handed over from the WLAN access point to one of the first RAN or a second RAN implementing a different radio access technology than the first RAN, enabling the UE to establish the connection with the first RAN.

2. The method of claim 1, further comprising:
    responsive to current coverage provided by the WLAN access point being insufficient to continue supporting the first PDN connection, implementing a direct handover of the first PDN connection to a second RAN of the mobile network, the second RAN implementing a different radio access technology than the first RAN.

3. The method of claim 2, wherein the first RAN is a Fifth Generation New Radio (5G NR) RAN and the second RAN is a Fourth Generation (4G) Long Term Evolution (LTE) RAN.

4. The method of claim 1, wherein preventing the UE from establishing the connection with the first RAN comprises detaching the UE from the first RAN.

5. The method of claim 4, further comprising:
responsive to detaching the UE from the first RAN, handing over a second PDN connection established between the UE and the first RAN to a second RAN of the mobile network, the second RAN implementing a different radio access technology than the first RAN, and the second PDN connection for establishing a data connection.

6. The method of claim 1, wherein preventing the UE from establishing the connection with the first RAN comprises at least one:
actively selecting a second RAN of the mobile network over the first RAN, the second RAN implementing a different radio access technology than the first RAN; or
disregarding detected cells of the first RAN.

7. The method of claim 1, wherein preventing the UE from establishing the connection with the first RAN comprises disabling one or more components of the UE that enable the UE to establish the connection with the first RAN.

8. The method of claim 1, wherein preventing the UE from establishing the connection with the first RAN comprises preventing the UE from establishing the connection with the first RAN while the first PDN is established.

9. The method of claim 1, wherein preventing the UE from establishing the connection with the first RAN is further in response to a voice call being currently active over the first PDN connection.

10. The method of claim 9, further comprising:
responsive to termination of the voice call, enabling the UE to establish the connection with the first RAN.

11. The method of claim 1, wherein preventing the UE from establishing the connection with the first RAN is further in response to a Wireless Fidelity (Wi-Fi) calling mode having been enabled at the UE.

12. The method of claim 11, further comprising:
responsive to the Wi-Fi calling mode having been disabled, enabling the UE to establish the connection with the first RAN.

13. A computer-readable storage medium, embodying a set of executable instructions, the set of executable instructions to manipulate a computer system to perform the method of claim 1.

14. A user equipment device, comprising:
one or more radio frequency (RF) modems configured to wirelessly communicate with at least one network;
one or more processors coupled to the one or more RF modems; and
at least one memory storing executable instructions, the executable instructions configured to manipulate at least one of the one or more processors or the one or more RF modems to:
establish a first packet data network (PDN) connection between the UE and an Internet Protocol Multimedia Service (IMS) network of the at least one network via a wireless local area network (WLAN) access point, the first PDN connection for implementing a voice call;
responsive to at least one of the UE or the at least one network failing to support Voice over New Radio (VoNR), prevent the UE from establishing a connection with a first radio access network (RAN) of the at least one network; and
responsive to the first PDN connection having been handed over from the WLAN access point to one of the first RAN or a second RAN implementing a different radio access technology than the first RAN, enable the UE to establish the connection with the first RAN.

15. The user equipment device of claim 14, wherein the executable instructions are further configured to manipulate at least one of the one or more processors or the one or more RF modems to:
responsive to current coverage provided by the WLAN access point is being insufficient to continue supporting the first PDN connection, implement a direct handover of the first PDN connection to a second RAN of the at least one network, the second RAN implementing a different radio access technology than the first RAN.

16. The user equipment device of claim 14, wherein preventing the UE from establishing the connection with the first RAN comprises preventing the UE from establishing the connection with the first RAN while the first PDN connection is established.

17. The user equipment device of claim 14, wherein preventing the UE from establishing the connection with the first RAN is further in response to a voice call being currently active over the first PDN connection.

18. The user equipment device of claim 14, wherein the executable instructions are further configured to manipulate at least one of the one or more processors or the one or more RF modems to:
responsive to termination of the voice call, permit the UE to establish the connection with the first RAN.

* * * * *